United States Patent [19]

Bailey et al.

[11] 3,861,148

[45] Jan. 21, 1975

[54] METHOD AND APPARATUS FOR CONVERTING HEAT ENERGY TO MECHANICAL ENERGY

[76] Inventors: Leo Bailey, Green Acres Mobile Est., Lot 58; David R. Kimmel, 4441 10th Ave. N., both of Lake Worth, Fla. 33460

[22] Filed: Nov. 12, 1973

[21] Appl. No.: 415,175

[52] U.S. Cl. ............... 60/650, 60/39.18 R, 60/325, 60/671, 60/673, 60/682, 122/31, 417/375
[51] Int. Cl. ........ F04f 1/18, F15b 21/06, F15b 1/00
[58] Field of Search ....... 60/39.18 R, 325, 649, 650, 60/671, 672, 682; 417/375; 122/31

[56] References Cited
UNITED STATES PATENTS

| | | | |
|---|---|---|---|
| 2,561,604 | 7/1951 | Alcock | 60/649 X |
| 3,627,449 | 12/1971 | Salo | 60/39.18 R |
| 3,756,022 | 9/1973 | Pronovost | 60/39.18 R |

*Primary Examiner*—Irwin C. Cohen
*Assistant Examiner*—Allen M. Ostrager
*Attorney, Agent, or Firm*—Cushman, Darby & Cushman

[57] ABSTRACT

An engine and method for converting heat energy into mechanical energy in a continuous process utilizing two fluids, one having a high boiling point and one having a lower boiling point. The high boiling point fluid is heated initially and then the lower boiling point fluid is injected into the high boiling point fluid so that it immediately vaporizes, but without ignition. The expansion in volume of the low boiling point fluid results in a pressure against the high boiling point fluid which is in turn forced against an impeller causing rotation of the power output shaft. The low boiling point fluid is then removed from the high boiling point fluid and channeled into a chamber adjacent the high boiling point fluid so as to be disposed in a heat exchange relation thereto. The low boiling point fluid is then ignited and the resultant energy transferred to the high boiling point fluid. The ignited gases are then exhausted.

11 Claims, 3 Drawing Figures

METHOD AND APPARATUS FOR CONVERTING HEAT ENERGY TO MECHANICAL ENERGY

BACKGROUND OF THE INVENTION

This invention relates to an engine and method for converting heat energy into mechanical energy in a continuous manner.

Most engines which convert heat energy into mechanical energy that have heretofore been designed have a fairly low over-all efficiency with regard to the energy available as an input in relation to the energy which is generated and utilized for a power output. In many engines this is due to the fact that the fuel, after expansion and/or combustion, is often immediately exhausted or removed from the power producing system so that only a small fraction of the available energy within the fuel has been utilized to create a power output. This results, in many instances, in a high weight of the apparatus and a low horsepower output which is undesirable especially for vehicular uses.

In an attempt to overcome these serious problems associated with engines of this type, many complicated designs and variations of past designs, have been developed in an attempt to produce an engine capable of utilizing a higher percentage of the energies available from the expanded and/or combusted fuel.

SUMMARY OF THE INVENTION

We believe we have achieved the above desired results and overcome the above described disadvantages by providing a unique design in an engine and a method for converting heat energy into mechanical energy in a continuous manner by utilizing two fluids, one of high boiling point and one of a lower boiling point. In the engine, the high boiling point fluid is contained within a chamber and initially heated by external means to an appropriate temperature. The low boiling point fluid is then injected into the chamber and into the high boiling point fluid so as to cause the low boiling point fluid to immediately vaporize. As the low boiling point fluid vaporizes, the high boiling point fluid is displaced as a result of the increase in volume of the low boiling point fluid, due to vaporization. The high boiling point fluid is then propelled in this manner against an impeller blade, or similar means for imparting movement to a drive mechanism, so as to remove usable work from the system. The low boiling point fluid which has been vaporized is then removed from the chamber into another chamber, adjacent the wall portion of the initial chamber containing the high boiling point fluid, so as to be in heat exchange relation thereto. The low boiling point fluid is then ignited, causing the high boiling point fluid to be heated, thus sustaining the cycle.

Depending upon the fluids utilized, and particularly the low boiling point fluids utilized, it may or may not be necessary to mix the low boiling point fluid with air or oxygen in the other chamber, in order to initiate and sustain combustion. Also, an external heat source may be utilized to heat the high boiling point fluid and eliminate the requirement for combustion of the low boiling point fluid, thus allowing non-combustible fluids having a low point of vaporization, such as water, to be utilized in the system.

In the case where the low boiling point fluid utilized as fuel is combustible, since expansion of the fuel is the prime motivating source of the engine, due to its action on the high boiling point fluid and the resultant action of the fluid on the impeller blades, low grade or mixed fuels may be utilized as long as the fuel used is capable of supplying adequate heat when combusted to maintain the high boiling point fluid at the appropriate operating temperature.

DETAILED DESCRIPTION OF THE PREFERRED EMBODIMENT

Figure 1:
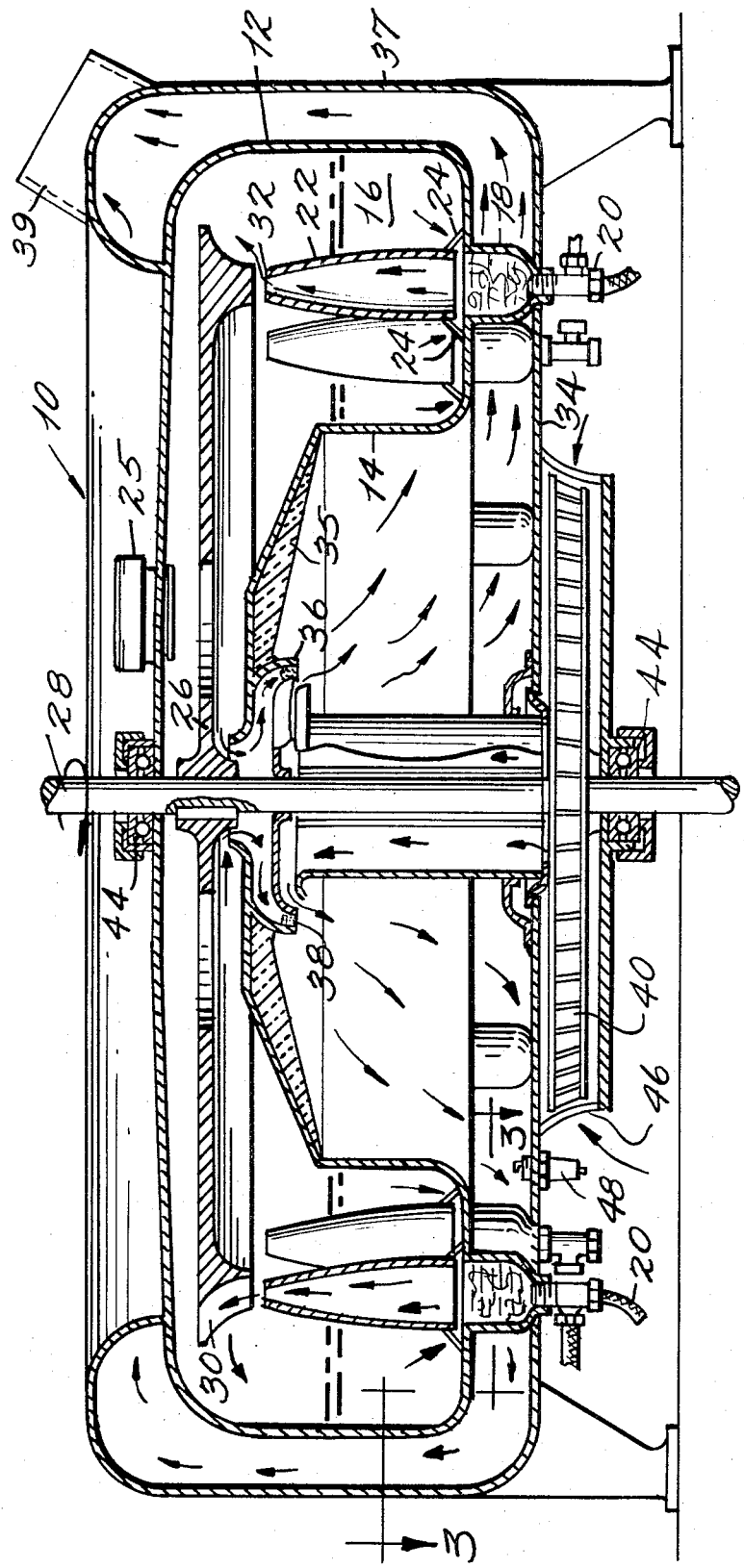
FIG. 1 is a front plan view in cross section of an embodiment of the present invention.
Figure 2:
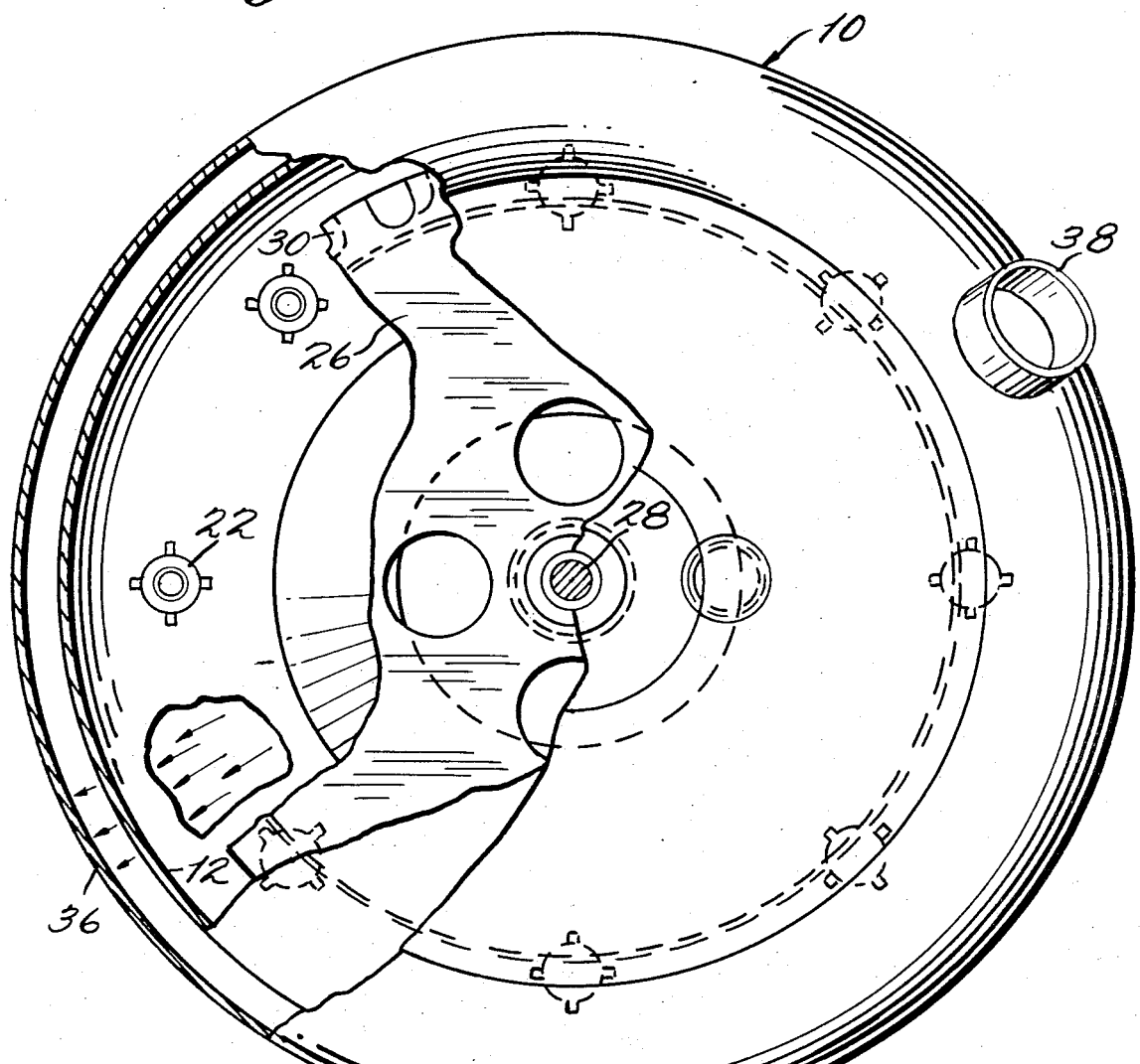
FIG. 2 is a top pictorial view in partial cross section of the embodiment shown in FIG. 1.
Figure 3:
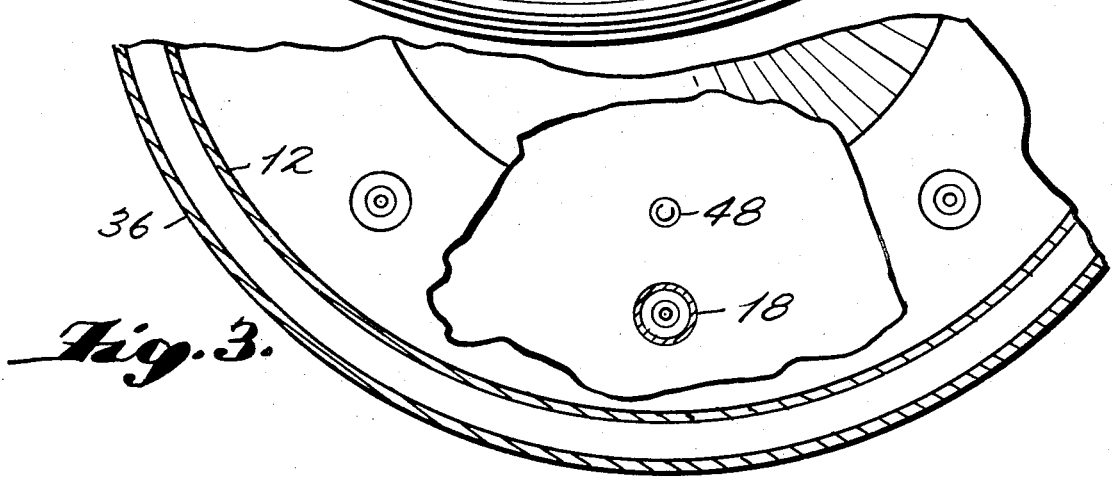
FIG. 3 is a partial cross section along line 3—3 of the embodiment of FIG. 1.

The heat engine 10 of the present invention has an internal chamber 12 with a donut-shaped portion 14 which contains a high boiling point fluid 16 such as lead. The chamber 12 has a lower cup-shaped portion 18 to which is secured, at the bottom end thereof, a fuel injection means 20 which is utilized to inject a lower boiling point fluid, such as a common petroleum-based fuel. Positioned above cup-shaped portion 18 is a funnel-shaped member 22, secured to the bottom portion of the chamber by support rods 24. An opening is provided between funnel-shaped member 22 and the bottom portion of chamber 12 due to elevation of the funnel-shaped member on the support rods, in order to allow fluid 16 to pass from chamber 12 into lower portion 18. An inlet opening 25 is provided in an upper portion of chamber 12 to allow the high boiling point fluid to be inserted, replenished, etc. Also, this opening 25 may be utilized for inserting a means (not shown) for initially bringing the temperature of the high boiling point fluid 16 up to the appropriate temperature.

An impeller 26 secured to the drive shaft 28 contains a series of turbine-like blades 30 against which the high boiling point fluid 16 acts, in a manner to be described later herein. The blades 30 are disposed above the mouth 32 of funnel-shaped member 22 in such a manner that when fluid 16 is expelled from funnel-shaped member 22, it impinges upon one of blades 30 so as to cause movement of impeller 26 and thus, shaft 28.

A combustion chamber 34 is disclosed adjacent chamber 12, at least surrounding the portion 14 containing the higher boiling point fluid 16, so as to be in heat exchange relation thereto. Duct 36 communicates chamber 12 with chamber 34 so as to allow the lower boiling point fluid to pass from chamber 12 to chamber 34. A flame retardant material 38 may be utilized in the opening of duct 36 into chamber 34, so as to prevent pre-mature ignition of the lower boiling point fluid as it passes from chamber 12 to chamber 34 and to prevent a "flash-back" into expansion chamber 12 due to combustion of gases in chamber 34. Also, an insulation material 35 may be necessary on at least the upper portion of chamber 34 to prevent pre-ignition of the low boiling point fluid in chamber 12 due to heating up of the wall surface common to chambers 12 and 34.

In communication with chamber 34 is an exhaust system 37 which allows ignited gases to be removed from the engine through exhaust port 39.

Also, attached to the drive shaft 28 is a blower 40 and airduct 42 which rotate with shaft 28 and impeller 26 to constitute the only moving parts in the engine, except for the bearings 44 which support shaft 28 for rotation. Blower 40 is an involute type blower which causes air to be taken in through ports 46 in the lower portion of engine 10 so as to move the air into duct 42 and inject it into chamber 34, where it can be mixed with the low boiling point fluid prior to ignition.

An ignitor 48 is provided, which is shown herein as a conventional sparkplug, but may be a "glow plug" or similar continuous ignition means, in order to sustain a continuous ignition of the low boiling point fluid in chamber 34. This is not to say that in certain systems utilizing the invention it would not be desirable to use a discontinuous ignition, where the low boiling point fluid and/or the air mixture, would be allowed to accumulate in the chamber 34 prior to ignition.

Fuel injectors 20 may be controlled to supply a discontinuous stream of low boiling point fluid in a pulse-like manner having an adequate amount of time between pulses to allow cup-shaped portion 18 to be replenished with fluid 16. Any conventional means (not shown) for controlling this type of fuel injector, in whatever manner is most appropriate, dependent upon the fluids utilized, may be used to control fuel injectors 20.

In regard to the manner in which the invention functions, a fluid of relatively high boiling point, such as lead, is placed in lower portion 14 of chamber 12 and also in cup-shaped portion 18. The lead is initially heated to a liquid state by supplying external heat either directly into chamber 12 or into chamber 34 so as to heat the lead 16 from the outside. Once the lead is in its molten state, a lower boiling point fluid is injected into cup-shaped portion 18 by injector 20. The temperature differential and boiling points of the two fluids must be such that the low boiling point fluid will immediately vaporize as it is injected into cup-shaped portion 18 without ignition. The resultant expansion of the low boiling point fluid due to vaporization will cause the lead 16 to be moved upwardly through funnel-shaped member 22 thus propelled against blades 30 or impeller member 26. This in turn induces movement in impeller 26 and imparts rotation to drive shaft 28 from which the power output may be removed.

Although this has been explained in relation to a single injector system, it is to be understood that either a continuous operation of multiple injectors or a sequential operation of multiple injectors with the associated cup-shaped portion 18 and funnel-shaped members 22 are intended to be utilized.

As the lead 16 is expelled from the funnel-shaped member 22, the low boiling point fluid is allowed to escape into the upper portion of chamber 12 in its vapor form and then moves through duct 36 into combustion chamber 34. The low boiling point fuel then mixes with air provided by duct 42 at the opening into chamber 34. The mixture of air and low boiling point fuel is then ignited into chamber 34. The resultant heat energy of this ignition is utilized to return energy to lead 16 by heat transfer through the wall portions of chamber portion 14, thus sustaining the cycle.

As the lead 16 is expelled from lower cup portion 18 due to injection of the low boiling point fuel, it is resupplied through the opening between lower cup-shaped portion 18 and funnel-shaped member 22 adjacent stanchions 24.

After ignition of the low boiling point fuel mixture with air, the ignited gases are allowed to escape through exhaust system 36 and out exhaust port 38.

Although the foregoing description illustrates the preferred embodiment of the engine of the present invention, as well as indicating an association with the descriptions thereof, the preferred method of the present invention, it will be apparent of those skilled in the art that variations are possible. All such variations, as would be obvious to those skilled in this art, are intended to be included within the scope of this invention.

What is claimed:

1. A method of converting heat energy to mechanical energy in a continuous cyclical manner, wherein each cycle comprises the steps of:
    injecting a fuel into a confined expansion zone containing a hot liquid, said fuel having a boiling point lower than the boiling point of said liquid;
    heating said fuel by contact with said hot liquid contained within said expansion zone, so as to cause expansion of said fuel but without igniting said fuel;
    imparting motion to said liquid out of said expansion zone as a result of said expansion of said fuel;
    imparting motion to a power transmitting means by action of said liquid against said power transmitting means;
    collecting said liquid in a collection zone in communication with said expansion zone;
    allowing said expanded fuel to leave said expansion zone and enter said collecting zone;
    removing said expanded fuel from said collecting zone into a combustion zone disposed in heat exchange relation to said liquid;
    igniting said fuel in said combustion zone so as to heat said liquid adequately to develop and maintain said liquid at conditions appropriate to cause said fuel to be expanded in accordance with said heating step;
    exhausting said ignited fuel from said combustion zone; and
    replacing said liquid in said expansion zone with at least a portion of said liquid collected in said collecting zone.

2. A method as defined in claim 1 wherein said liquid is lead and said fuel is a petroleum base liquid.

3. An engine for converting heat energy to mechanical energy in a continuous manner, comprising:
    a fuel expansion chamber means;
    a fuel injection means for injecting fuel into said fuel expansion chamber;
    a liquid reservoir means opening into said fuel expansion chamber for providing a hot liquid to come in contact with said fuel in said expansion chamber, said hot liquid having appropriate characteristics such that will cause fuel injected into said chamber to expand considerably but without ignition of said fuel and which will cause movement of said liquid, said fuel having a lower boiling point than said liquid.
    a power transmitting means disposed an appropriate relation to said chamber so as to be in the path of movement of said hot liquid;
    means for directing said hot liquid against said power transmitting means so as to cause movement thereof;

expanded fuel distributing means associated with said chamber for allowing said fuel to leave said chamber;

a fuel combustion chamber disposed about said reservoir means in heat exchange relation thereto and connected to said fuel distributing means;

fuel injection means disposed in said combustion chamber for igniting said fuel; and exhaust means opening into said combustion chamber for allowing ignited fuel to leave said combustion chamber.

4. An engine as defined in claim 3 wherein said fuel expansion chamber means is a plurality of chambers disposed in spaced relation concentrically about a central axis.

5. An engine as defined in claim 4 wherein said power transmitting means is a plurality of baffles disposed in spaced relation concentrically about said central axis and having a power output shaft to which said baffles are secured, said shaft being disposed concentrically with said central axis, said baffles being in appropriate relation to said fuel expansion means so as to cause rotation of said shaft.

6. An engine as defined in claim 4 wherein said fuel injection means is a plurality of fuel injectors, each of which corresponds to one of said plurality of expansion chambers and supplies the same with an appropriate amount of fuel.

7. An engine as defined in claim 4 wherein said reservoir means is a chamber disposed concentrically about said central axis and in register with said plurality of expansion chambers.

8. An engine as defined in claim 5 wherein said directing means is a plurality of substantially funnel-shaped portions of each of said plurality of expansion chambers, each of said plurality of funnel-shaped portions being in register with said plurality of baffles so as to cause movement of said power transmitting means as a result of the impingement of said hot liquid on said baffles.

9. An engine as defined in claim 7 wherein said fuel combustion chamber is disposed concentrically about said reservoir means.

10. An engine as defined in claim 3 and further including air intake means associated with said combustion chamber for providing oxygen for combustion of said fuel in said chamber.

11. An engine as defined in claim 3 wherein said fuel is a petroleum-based liquid and said hot liquid is lead.

* * * * *